(12) United States Patent
Buhrke

(10) Patent No.: US 8,127,632 B2
(45) Date of Patent: Mar. 6, 2012

(54) SHIFT DEVICE OF A POWER TAKE-OFF TRANSMISSION

(75) Inventor: Frank Buhrke, Birkenau (DE)

(73) Assignee: Deere & Company, Moline, IL (US)

( * ) Notice: Subject to any disclaimer, the term of this patent is extended or adjusted under 35 U.S.C. 154(b) by 406 days.

(21) Appl. No.: 12/337,908

(22) Filed: Dec. 18, 2008

(65) Prior Publication Data

US 2009/0158872 A1 Jun. 25, 2009

(30) Foreign Application Priority Data

Dec. 22, 2007 (DE) .......................... 10 2007 062 456

(51) Int. Cl.
*F16H 37/00* (2006.01)
(52) U.S. Cl. ......................... 74/11; 74/15.69; 74/15.88
(58) Field of Classification Search ............. 74/11, 15.6, 74/15.66, 15.69, 15.88
See application file for complete search history.

(56) References Cited

U.S. PATENT DOCUMENTS

| | | | | |
|---|---|---|---|---|
| 3,464,277 | A | * | 9/1969 | Longshore ..................... 74/15.4 |
| 3,830,111 | A | | 8/1974 | Travaglio |
| 4,716,775 | A | * | 1/1988 | Horii et al. .................... 74/15.86 |
| 5,439,088 | A | | 8/1995 | Michioka et al. |
| 5,667,330 | A | * | 9/1997 | Henkel et al. ................. 403/328 |
| 6,718,841 | B1 | * | 4/2004 | Schepperle ..................... 74/359 |
| 6,854,541 | B2 | * | 2/2005 | Matufuji et al. ............. 180/53.1 |

FOREIGN PATENT DOCUMENTS

| | | |
|---|---|---|
| DE | 4228797 | 3/1994 |
| DE | 10255179 | 6/2004 |
| DE | 102004036505 | 3/2006 |
| DE | 102005028122 | 12/2006 |
| EP | 0 322 368 | 6/1989 |
| EP | 0 665 130 | 8/1995 |
| GB | 2247500 | 3/1992 |

OTHER PUBLICATIONS

German Search Report, Dec. 11, 2008, 4 pages.

* cited by examiner

*Primary Examiner* — Justin Holmes

(57) ABSTRACT

A shift device for a power take-off transmission. An input shaft is connectable to an output shaft with three gear pairs. The output shaft has a recess, in which a PTO stub shaft can be reversibly introduced. A mechanism, actuated by a PTO stub shaft actuates a gearshift sleeve, provided on the output shaft and rotationally fixed to the output shaft, is provided on the output shaft. In one shift position of the gearshift sleeve is rotationally fixed to a gear wheel of a first gear pair. In another shift position of the gearshift sleeve no fixed connection exists between the gearshift sleeve and gear wheel of the first gear pair. By means of a further gearshift sleeve a rotationally fixed connection can be established with a gear wheel of the second or the third gear pair.

13 Claims, 4 Drawing Sheets

SHIFT DEVICE OF A POWER TAKE-OFF TRANSMISSION

FIELD OF THE INVENTION

The invention relates to a shift device of a power take-off (PTO) transmission of an agricultural utility vehicle, in particular a tractor. The shift device comprises an input shaft that can be driven by an engine of the utility vehicle, and an output shaft. The input shaft can be connected to the output shaft by way of three gear pairs, in order to transmit torque from the input shaft to the output shaft via one of the three gear pairs. Three gear wheels of the gear pairs are assigned to the input shaft. The other three gear wheels of the gear pairs are assigned to the output shaft. One gear wheel of a gear pair is rotationally fixed to the output shaft or the input shaft and the other gear wheel of the gear pair can be rotationally fixed to the output shaft or the input shaft—for example by a gearshift sleeve. The two gear wheels of a gear pair intermesh with one another. The output shaft has a recess, in which a PTO stub shaft can be reversibly introduced. A mechanism, which can be actuated by a PTO stub shaft and which serves to actuate a gearshift sleeve, provided on the output shaft and rotationally fixed to the output shaft, is provided on the output shaft. In one shift position of the gearshift sleeve the gearshift sleeve is rotationally fixed to a gear wheel of a first gear pair.

BACKGROUND OF THE INVENTION

The toothed PTO stub shaft and the output shaft of the PTO transmission usually form a shaft-hub connection, the output shaft comprising the recess having the hub function. Shaft-hub connections have long been known in the state of the art and serve for rotationally fixing two shafts together, in order to transmit torques from one shaft to the other. This is a positively interlocking connection, in which torques are transmitted from one shaft to the other by virtue of their mating shapes. Shaft-hub connections are used in motor vehicle transmissions, particularly where shaft connections frequently have to be changed.

On John Deere agricultural tractors in the 5000, 6000 and 7000 series, for example, the rear PTO at the rear of the tractor is designed in such a way that a PTO stub shaft is embodied as a reversible, double-sided shaft. The PTO stub shaft has a 6-tooth profile on a first end area and a 21-tooth profile on another end area. These two profiles are described in relevant standards. The operator can therefore introduce the PTO stub shaft into the PTO with one tooth profile or the other. Different implements, which are each intended for operation at standard speeds (of 540 or 1000 rpm) can therefore easily have their drive shaft adapted to the tractor, the respective drive shaft having a toothing (6 or 21-tooth profile) designed to complement the toothing of the PTO stub shaft. The reversible PTO stub shaft is rotationally fixed by means of drive toothing to the output shaft or PTO of the PTO transmission.

For agricultural machines it is therefore typical to offer different PTO speeds. The following speeds, for example are used as standard: 540 rpm, 1000 rpm, 540E and 1000E. In the case of the 540E and 1000E speeds (E=Economy) the respective speeds 540 rpm and 1000 rpm are substantially available, but the overall gear ratios of the PTO transmission and/or of the vehicle transmission are selected so that the internal combustion engine can in this case be operated at a lower number of revolutions (for example, at just 1700 or 1600 rpm instead of 2100 or 2000 rpm) and can thereby be operated more favorably in terms of fuel consumption. For these different speeds and also power output ranges, the different aforementioned PTO tooth profiles of the transmission output shaft are used, that is to say the 6, 20 or 21-tooth profile. In various regulations and guidelines it is specified, particularly in the USA, that for the 540 and 540E speeds the 6-tooth profile must be available for connection to the implement, whilst for the 1000 (or also the 1000E) speed, use of the 21-tooth profile is obligatory as is the use of a 20-tooth profile for higher power classes. Alternatively the required PTO speed must be automatically limited.

Various systems are known, in which a mechanism of the PTO transmission is automatically shifted by reversing or even changing the PTO stub shaft. This mechanism shifts a gearshift sleeve, for example, in the case of two-speed PTOs, or in the case of three-speed PTOs a lever mechanism is used which, if the 6-tooth profile is projecting, mechanically or electronically prevents the setting for the 1000 rpm speed. The costs of such lever systems are high and the design configuration can be susceptible to malfunction.

SUMMARY OF THE INVENTION

The object of the present invention, therefore, is to provide a shift device of the type specified in the introduction, which will overcome the aforementioned problems. In particular, it should be possible, by exchanging or reversing the PTO stub shaft, to set the desired speed range and in so doing to ensure that with an existing tooth profile on the PTO stub shaft a speed associated with this tooth profile is correspondingly set, the intention being to reduce the costs of such a system and to render the design configuration of the mechanism less susceptible to malfunction.

A shift device of the type specified in the introduction is provided in which in another shift position of the gearshift sleeve no rotationally fixed connection exists between the gearshift sleeve and the gear wheel of the first gear pair. By means of a further gearshift sleeve a rotationally fixed connection can be established with a gear wheel of the second gear pair or with a gear wheel of the third gear pair.

It is recognized that a lever mechanism known in the state of the art and sometimes susceptible to malfunction is not necessary for switching the PTO transmission over if all switching processes are performed by means of gearshift sleeves. These can be embodied in such a way that no pivoting lever is provided, as is disclosed, for example, in U.S. Pat. No. 3,830,111. According to the invention, provision is instead made for the gearshift sleeve rotationally fixed to the output shaft, with which on the one hand a rotationally fixed connection can be established between the gear wheel of the first gear pair, and with which on the other hand no rotationally fixed connection exists between the gearshift sleeve and the gear wheel of the first gear pair. A further gearshift sleeve is also provided, with which a rotationally fixed connection can be established with a gear wheel of the second gear pair, or with which a rotationally fixed connection can be established to a gear wheel of the third gear pair. The further gearshift sleeve may be actuated by a mechanical, electromagnetic, pneumatic or hydraulic actuator, which may be activated, in particular, by an electronic control device. In this respect the shift device according to the invention is capable of providing a PTO transmission, which can afford three different transmission ratios, which is advantageously cost-effective and which has a lower susceptibility to malfunction than is the case with PTO transmissions known in the state of the art.

In other words the gearshift sleeve has at least two shift states. In the one shift state the gearshift sleeve is rotationally fixed to the gear wheel of the first gear pair or is in rotationally fixed engagement therewith. In a second shift state of the gearshift sleeve the gearshift sleeve is not in rotationally fixed engagement with the gear wheel of the first gear pair, so that in this state the gearshift sleeve is in a "neutral" shift state for the first gear pair. The further gearshift sleeve could have at least two, but preferably three shift states. In a first shift state the further gearshift sleeve is rotationally fixed to a gear wheel of the second gear pair. In a second shift state of the further gearshift sleeve this is rotationally fixed to a gear wheel of the third gear pair, and in a third shift state of the further gearshift sleeve this is rotationally fixed neither to the gear wheel of the second gear pair nor to the gear wheel of the third gear pair. Accordingly this third shift position of the further gearshift sleeve is the "neutral" position in respect of the second and the third gear pairs.

According to a first embodiment the further gearshift sleeve is rotationally fixed to the output shaft. The further gearshift sleeve is preferably arranged between two gear wheels of the second and third gear pair. The gear wheels are embodied as loose gears and are assigned to the output shaft. The loose gears of the second and third gear pair are therefore rotatably arranged with roller bearings, for example, on the output shaft. If the further gearshift sleeve is in rotationally fixed engagement with the gear wheel or the loose gear of the second gear pair, torque is transmitted between the input shaft and the output shaft via the second gear pair. If the further gearshift sleeve is in rotationally fixed engagement with the loose gear of the third gear pair, torque is transmitted between the input shaft and the output shaft via the third gear pair of the PTO transmission.

In an alternative embodiment to this, the further gearshift sleeve is rotationally fixed to the input shaft. The further gearshift sleeve is most preferably arranged between two gear wheels of the second and third gear pair, embodied as loose gears and assigned to the input shaft. According to this embodiment, the two loose gears and the further gearshift sleeve are arranged on the input shaft and the gear wheels of the second and third gear pair respectively meshing with the two loose gears are rotationally fixed to the output shaft. In other words, according to this embodiment (as opposed to the embodiment previously described) both the loose gears of the second and third gear pair and the further gearshift sleeve are arranged not on the output shaft but on the input shaft and the gear wheels of the second and third gear pairs, each meshing with the loose gears, are arranged on the other shaft, rotationally fixed to this shaft.

In another embodiment a carrier component is provided, on which the gear wheels, embodied in the form of loose gears, of the second and third gear pair are rotatably supported. This might be a substantially sleeve-shaped component, which in a middle area carries the further gearshift sleeve. The further gearshift sleeve is rotationally fixed to the carrier component and is arranged so that it is displaceable in an axial direction. The two loose gears of the second and third gear pairs could be arranged adjacent to the further gearshift sleeve. In this respect the carrier component with the further gearshift sleeve and the two loose gears may be associated as a modular assembly with the output shaft or the input shaft. The carrier component is rotationally fixed to the output shaft or the input shaft. This rotationally fixed connection could be achieved by a toothing correspondingly provided on the output shaft (or input shaft) and on the carrier component. Alternatively the carrier component could be arranged so that it can rotate in relation to the output shaft and might be capable of rotational fixing to the output shaft by means of the gearshift sleeve. For this purpose the gearshift sleeve and the carrier component could each have a corresponding toothing, which toothing systems in one position of the gearshift sleeve can be brought into engagement with one another, in order to establish the rotationally fixed connection between the output shaft and the carrier component.

As previously indicated, the further gearshift sleeve is assigned to the carrier component. In this case it is expedient to rotationally fix the further gearshift sleeve to the carrier component. In this respect the further gearshift sleeve serves to establish a rotationally fixed connection between the carrier component on the one hand and one of the two loose gears of the second or third gear pair. Since the carrier component is rotationally fixed to the output shaft or to the input shaft, however, torque can hereby be transmitted between the input shaft and the output shaft. For this purpose the further gearshift sleeve can be brought into rotationally fixed engagement with the loose gears of the second or third gear pair.

According to another embodiment the gear wheel of the first gear pair, which can be brought into rotationally fixed engagement with the gearshift sleeve, is assigned to the output shaft. According to this embodiment the gear wheel of the first gear pair is embodied as a loose gear. This loose gear, too, could be rotatably supported on the output shaft, for example by a roller bearing.

Should a fourth transmission stage or a fourth gear pair be required for the PTO transmission, according to one embodiment a further carrier component, on which at least two loose gears are rotatable supported, could be assigned to the output shaft. These two loose gears might be the gear wheel of the first gear pair on the one hand and a further gear wheel of a fourth gear pair on the other. The shift device of the PTO transmission could therefore comprise the carrier component already mentioned above on the one hand and the further carrier component on the other.

In order that a rotationally fixed connection can be established with the output shaft and the first carrier component, the gearshift sleeve rotationally fixed to the output shaft could in one shift position be brought into rotationally fixed engagement with the further carrier component. The rotationally fixed connection between the output shaft and the further carrier component can accordingly be established by the mechanism actuated by the PTO stub shaft. The further carrier component might be embodied in the form of a shaft, which is rotatably supported in the housing of the PTO transmission, and on which in turn at least two loose gears assigned to the further carrier component are arranged (each rotatably supported for this purpose).

According to this embodiment the gearshift sleeve rotationally fixed to the output shaft could in one shift position be brought into rotationally fixed engagement with the further carrier component. In this respect, according to this exemplary embodiment a rotationally fixed connection is established between the output shaft and the further carrier component by means of the gearshift sleeve, provided that the gearshift sleeve is situated in the corresponding shift position. If a gearshift sleeve is now assigned to the further carrier component, and if the gearshift sleeve is rotationally fixed to the further carrier component, a rotationally fixed connection can be established between the further carrier component and a loose gear, rotatably supported on the further carrier component by means of the gearshift sleeve assigned to the further carrier component. Consequently in this exemplary embodiment, for a torque transmission between the input shaft and the output shaft of the PTO transmission via the loose gears assigned to the further carrier component—for example via the 1st or 4th gear pair—it is necessary on the one hand for the gearshift sleeve rotationally fixed to the output shaft to be brought into rotationally fixed engagement with the further carrier component, and on the other for the gearshift sleeve assigned to the further carrier component to be brought into rotationally fixed engagement with a loose gear assigned to the further carrier component.

According to a preferred embodiment the mechanism actuated by a PTO stub shaft comprises a component moveable in an axial direction, which can be moved by means of a PTO stub shaft. The component is preferably biased, for example by means of a spring. The moveably arranged component could be accommodated in a corresponding bore or recess in the output shaft and could have a substantially cylindrical shape. The biasing by means of a spring could likewise be embodied in a bore, a blind hole or a corresponding hollow area of the shaft. The component is preferably formed in such a way that it serves to move the gearshift sleeve of the output shaft. Alternatively the component might interact with a further component, the further component serving to move the gearshift sleeve of the output shaft. The further component might be a spring pin, for example, which extends through the axially moveable component and is firmly connected thereto. The spring pin could be connected by its one end or by both ends to the gearshift sleeve, so that the component, the spring pin and the gearshift sleeve can be moved together in relation to the output shaft.

BRIEF DESCRIPTION OF THE DRAWINGS

Generally preferred embodiments will be explained with reference to the accompanying drawings wherein.

DESCRIPTION OF THE PREFERRED EMBODIMENT

Figure 1:
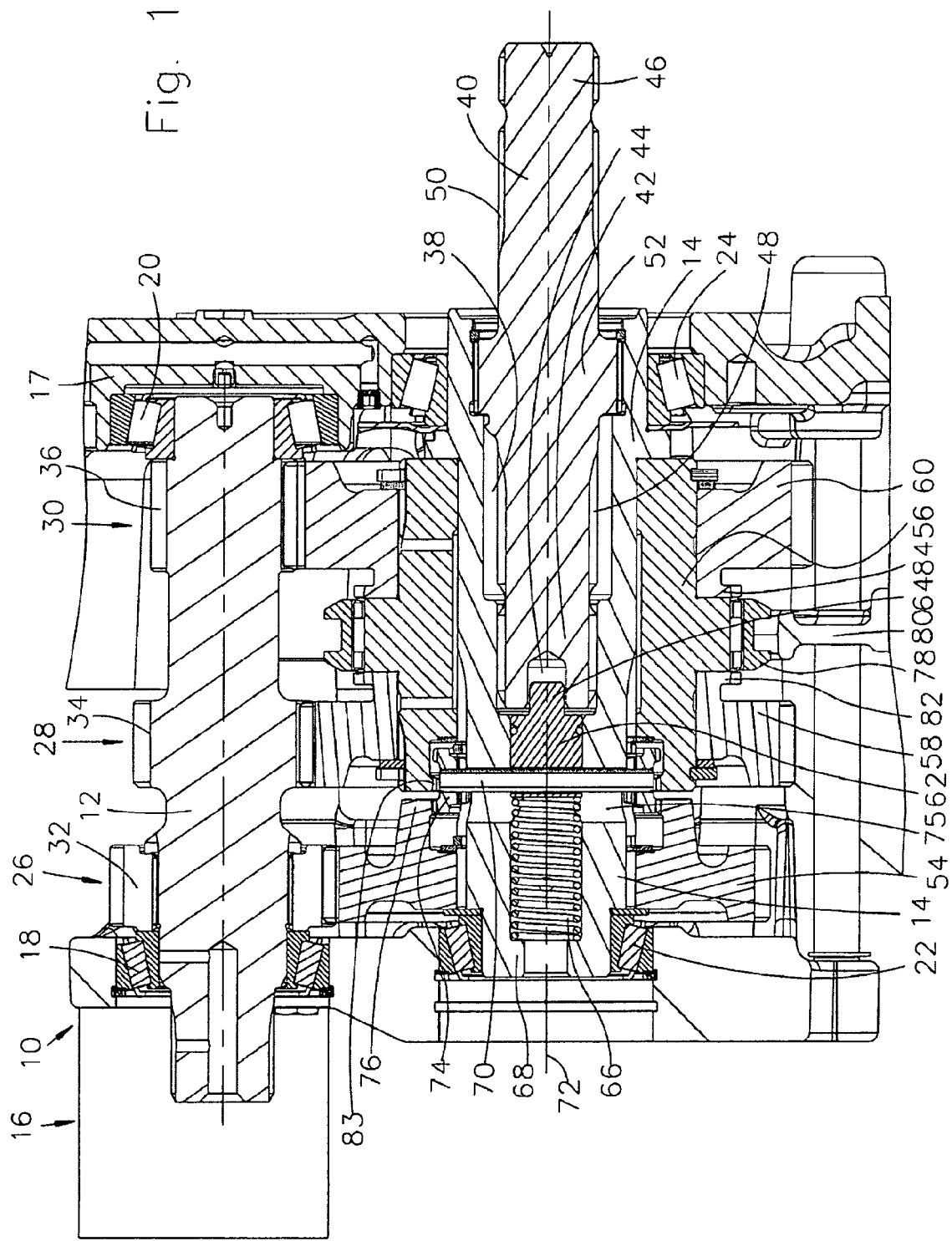
FIG. 1 shows in a schematic representation, an exemplary embodiment of a shift device according to the invention.
Figure 2:
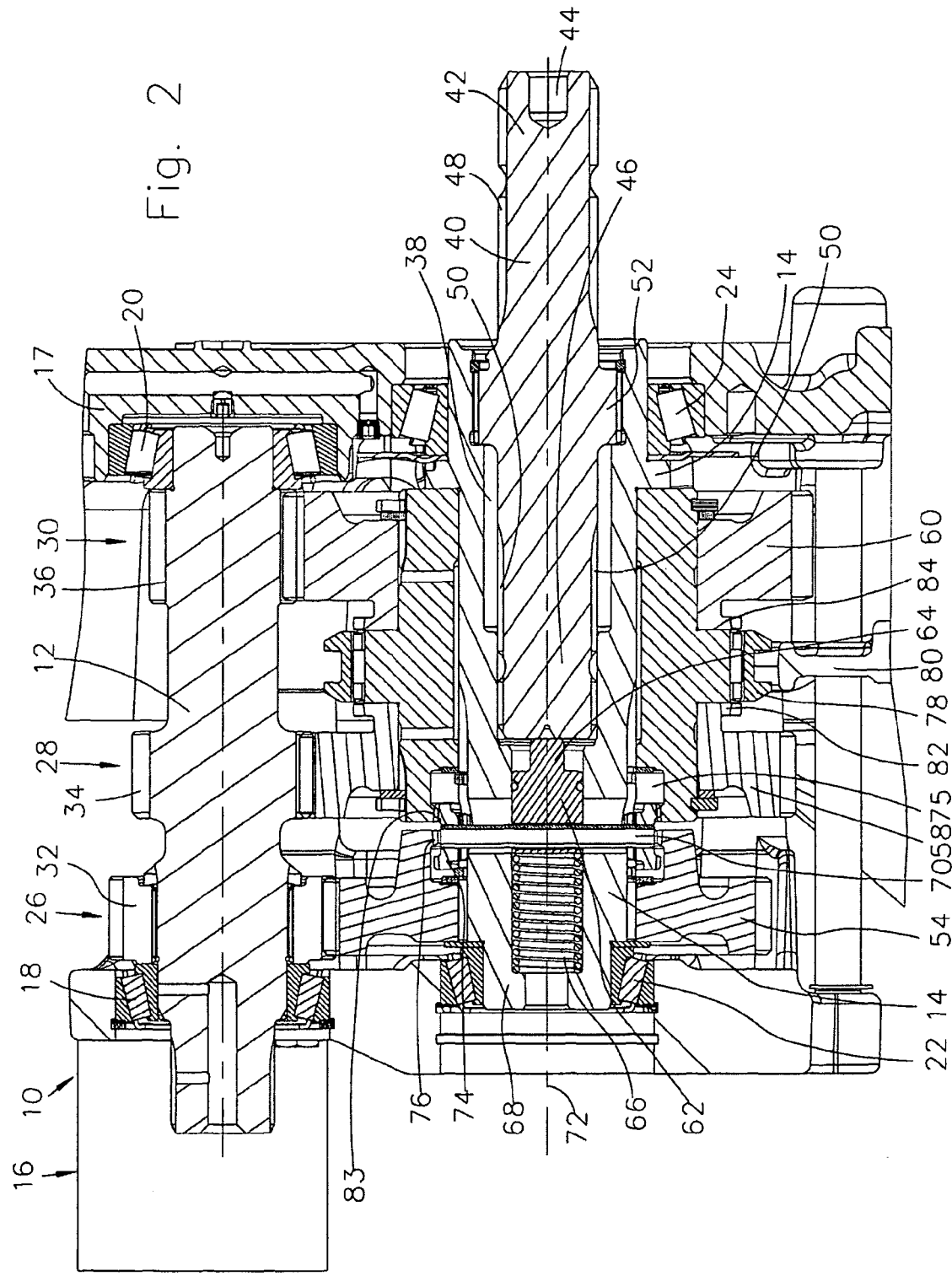
FIG. 2 shows in a schematic representation, an exemplary embodiment of a shift device according to the invention in a different shift state.
Figure 3:
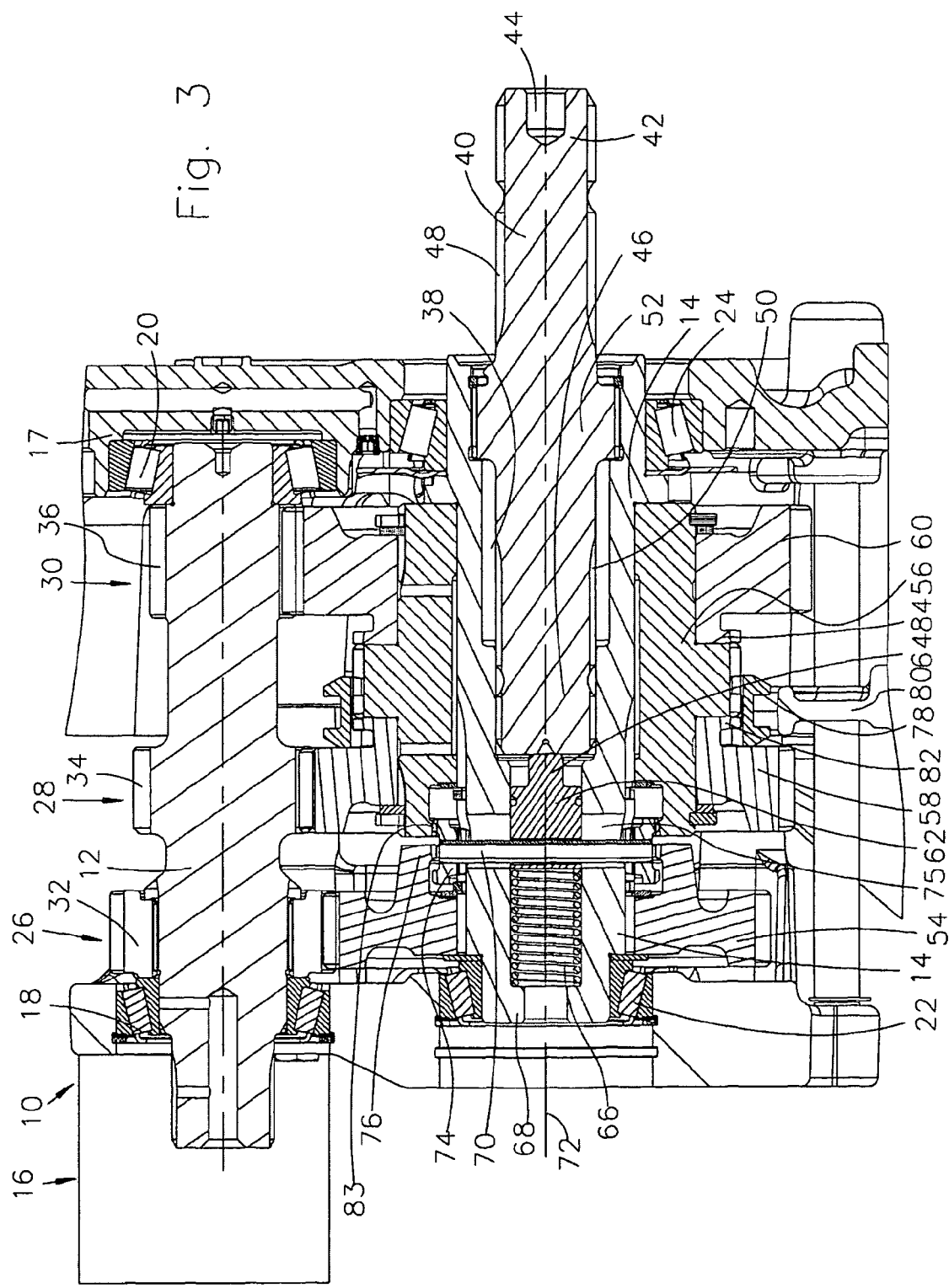
FIG. 3 shows in a schematic representation, an exemplary embodiment of a shift device according to the invention in a different shift state; and, FIG. 4 shows in a schematic representation, an exemplary embodiment of a shift device according to the invention in a different shift state.
Figure 4:
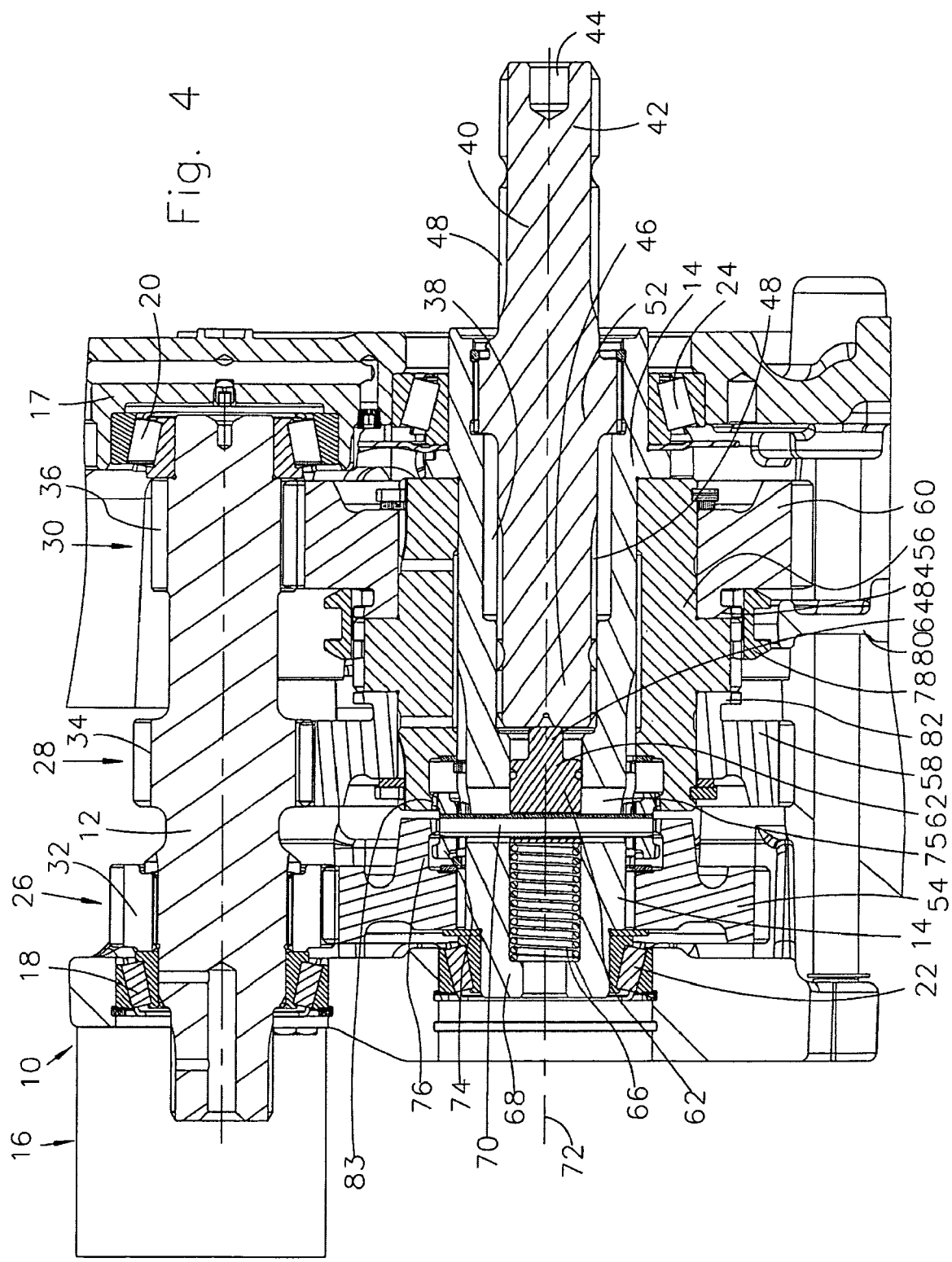

FIG. 1 shows a PTO transmission 10, which comprises an input shaft 12 and an output shaft 14. Via a clutch 16, which is only shown schematically, the input shaft 12 of the PTO transmission 10 can be connected by way of a transmission, not shown in the drawings, to an internal combustion engine of a tractor, likewise not shown in the drawings. The input shaft 12 is rotatably supported in the housing 17 by means of the bearings 18, 20. The output shaft 14 is rotatably supported in the housing 17 by the bearings 22, 24. Torque from the engine of the vehicle can be transmitted from the input shaft 12 to the output shaft 14 via one of three gear pairs 26, 28 or 30. The input shaft 12 thus comprises the gear wheels 32, 34 and 36, which are all rotationally fixed to the input shaft 12. The gear wheels 32, 34 and 36 are integrally formed with the input shaft 12. The gear wheel 32 is assigned to the first gear pair 26. The gear wheel 34 is assigned to the second gear pair 28 and the gear wheel 36 is assigned to the third gear pair 30. The output shaft 14 has a recess 38, into which the PTO stub shaft 40 can be introduced. The PTO stub shaft 40 is formed in such a way that it can, on the one hand, be inserted in a first manner into the recess 38, as is shown in FIG. 1. According to this the PTO stub shaft 40 is introduced by the one end 42 of the PTO stub shaft 40 into the recess 38 in the output shaft 14, which has a blind hole 44. In FIGS. 2 to 4, on the other hand, the PTO stub shaft 40 is introduced in a second manner into the recess 38 in the output shaft 14, in which the opposite end 46 of the PTO stub shaft to the end 42 is arranged in the recess 38.

The end 42 has an external toothing, which forms the 6-tooth profile and which serves for the use of attachments that can be operated at a speed of 540 rpm. the area of the other end 46 of the PTO stub shaft 40 an external toothing 50 is provided, which forms the 21-tooth profile and which can be used for drive shafts of implements which are operated at a speed of 1000 rpm.

In a middle area 52 of the PTO stub shaft 40 an external toothing is provided, which can be brought into meshing engagement with an internal toothing of the output shaft 14, so that by turning the output shaft 14 by means of the external and internal toothing torque can be transmitted between the PTO stub shaft 40 and the output shaft 14.

The gear wheel 54 is arranged on the output shaft 14. The gear wheel 54 is embodied in the form of a loose gear and is accordingly arranged so that it is rotatable in relation to the output shaft 14. The gear wheel 54 meshes with the gear wheel 32. The gear wheels 32 and 34 therefore form the first gear pair 26.

The carrier component 56 can then be rotationally fixed to the output shaft 14 when the right-hand toothing of the gearshift sleeve 74 is in engagement with the internal toothing 83 of the carrier component 56. This operating state is shown in FIGS. 2 to 4. The gear wheel 58 is provided on one side of the carrier component 56. The gear wheel 58 is embodied in the form of a loose gear and is accordingly arranged so that it can rotate in relation to the carrier component 56. The gear wheel 58 meshes with the gear wheel 34. The gear wheels 34 and 58 form the second gear pair 28. The gear wheel 60 is arranged on the carrier component 56 on the other side. The gear wheel 60 is likewise embodied in the form of a loose gear and is accordingly arranged so that it can rotate in relation to the carrier component 56 and/or in relation to the output shaft 14. The gear wheel 60 meshes with the gear wheel 36. The gear wheels 36 and 60 form the third gear pair 30.

The component 62 provided in the output shaft 14 can be actuated by the end 46 of the PTO stub shaft. The component 62 is a part of the mechanism that can be actuated by the PTO stub shaft 40 or the end 46 of the PTO stub shaft. The component 62 is moveable in an axial direction. FIG. 1 shows the component 62 in a position in which it is located in its right-hand limit position. This is possible, since the projection 64 or the lug of the component 62 can engage in the blind hole 44 in the PTO stub shaft 40. This is forcibly achieved by the spring 66, which is braced against the supporting area 68 of the output shaft 14. The spring 66 forces the component 62 towards the right, thereby biasing the component 62 towards the position shown in FIG. 1. If the end 46 of the PTO stub shaft 40 comes to bear against the component 62, this will be brought into the left-hand position shown in FIGS. 2 to 4, since the end 46 does not have any recess or blind hole and the lug 64 cannot therefore enter into the PTO stub shaft 40. The spring pin 70 is firmly connected to the component 62. The spring pin 70 extends transversely to the longitudinal axis 72 of the output shaft 14 or of the PTO stub shaft 40. With both of its ends the spring pin 70 is firmly connected to the gearshift sleeve 74, provided on the output shaft 14 and rotationally fixed to the output shaft 14. A bore 75, in which the movement of the spring pin 70 can be guided, is provided in the output shaft 14 substantially parallel to the alignment of the spring pin 70. For example, the spring pin 70 is shown in its right-hand limit position in FIG. 1 and in its left-hand limit position in FIGS. 2 to 4. Accordingly the gearshift sleeve 74 provided on the output shaft 14 is shown in the right-hand shift position (FIG. 1) and the left-hand shift position (FIGS. 2 to 4). When the gearshift sleeve 74 rotationally fixed to the output shaft 14 is situated in the right-hand position shown in FIG. 1, a rotationally fixed connection is established between the gearshift sleeve 74 and the part 76 of the gear wheel 54, which has an internal toothing, which can be brought into rotationally fixed engagement with the external toothing of the left-hand side of the gearshift sleeve 74. With the component 62, the spring pin 70 and the gearshift sleeve 74 in the position shown in FIG. 1, torque is transmitted from the input shaft 12 to the output shaft 14 via the gear pair 26, since the gear wheel 32 meshing with the loose gear 54 is rotationally connected and a torque flow occurs via the gear wheel 54 and the gearshift sleeve 74 to the output shaft 14 and hence to the PTO stub shaft 40. The transmission ratio of the PTO transmission 10 is accordingly switched in such a way that a drive shaft of an implement, which can be operated at a speed of 1000 rpm, can be connected to the end 46 of the PTO stub shaft 40.

In FIG. 2 the PTO stub shaft is inserted with the other end 46 into the recess 38 in the output shaft 14. The component 62, the spring pin 70 and the gearshift sleeve 74 are accordingly each located in their left-hand positions. There is consequently no rotationally fixed connection between the gear wheel 54 and the gearshift sleeve 74 and the output shaft 14 respectively.

The component 62, the spring pin 70 and the gearshift sleeve 74 always move together in opposition to the spring bias of the spring 66.

The carrier component 56 has a further gearshift sleeve 78, which is rotationally fixed to the carrier component 56. This gearshift sleeve 78, too, is displaceable in an axial direction. For this purpose a gearshift fork 80 (only partially drawn in) is provided, which can be actuated by a mechanism not shown in the drawing. In the position shown in FIG. 2 the gearshift sleeve 78 is located precisely between the two gear wheels 58, 60 and is rotationally fixed neither to the gear wheel 58 nor to the gear wheel 60. In this respect the gearshift sleeve 78 in the shift position according to FIGS. 1 and 2 is situated in its neutral position. In the shift state according to FIG. 2 no torque is transmitted from the input shaft 12 to the output shaft 14, since none of the loose gears 54, 58 or 60 has a rotationally fixed connection to the output shaft 14.

In FIG. 3 the gearshift sleeve 78 is shown in its left-hand shift position. Here it is in rotationally fixed engagement with the part 82 of the gear wheel 58, which has an external toothing. In the shift position of the gearshift sleeve 78 according to FIG. 3, the left-hand internal toothing of the gearshift sleeve 78 is accordingly in rotationally fixed engagement with the external toothing of the part 82 of the gear wheel 58. In the shift state of the gearshift sleeves 74 and 78 shown in FIG. 3, torque consequently flows from the input shaft 12 to the output shaft 14 via the second gear pair 28, which comprises the gear wheels 34 and 58.

FIG. 4 shows the PTO transmission 10, in which the gearshift sleeve 78 is situated in the right-hand shift position. The right-hand internal toothing of the gearshift sleeve 78 is consequently in rotationally fixed engagement with the external toothing of the part 84 of the gear wheel 60. In the shift position of the gearshift sleeves 74 and 78 according to FIG. 4, torque consequently flows from the input shaft 12 to the output shaft 14 via the third gear pair 30, which comprises the gear wheels 36 and 60.

Having described the preferred embodiment, it will become apparent that various modifications can be made without departing from the scope of the invention as defined in the accompanying claims.

The invention claimed is:

1. A shift device of a power take-off (PTO) transmission of an agricultural utility vehicle, in particular a tractor, comprising an input shaft driven by an engine of the utility vehicle, and an output shaft, the input shaft being connectable to the output shaft by way of first, second and third gear pairs, in order to transmit torque from the input shaft to the output shaft via one of the three gear pairs, three gear wheels of the gear pairs being assigned to the input shaft, three gear wheels of the gear pairs being assigned to the output shaft, one gear wheel of a gear pair being rotationally fixed to one of the input shaft or the output shaft and the other gear wheel of the gear pair being rotationally fixable to one of the output shaft or the input shaft by a gearshift sleeve, the two gear wheels of a gear pair intermeshing with one another, the output shaft having a recess, in which a PTO stub shaft is reversibly introduced, a carrier component on which the gear wheels, embodied in the form of loose gears, of the second and third gear pair, are rotatably supported and wherein the carrier component can be rotationally fixed to one of the output shaft and the input shaft, a mechanism, actuated by a PTO stub shaft and which serves to actuate a gearshift sleeve, provided on the output shaft and rotationally fixed to the output shaft, being provided on the output shaft, the gearshift sleeve in one shift position of the gearshift sleeve being rotationally fixed to a gear wheel of a first gear pair, wherein in another shift position of the gearshift sleeve no rotationally fixed connection exists between the gearshift sleeve and gear wheel of the first gear pair and wherein by means of a further gearshift sleeve a rotationally fixed connection is established with one of a gear wheel of the second gear pair or with a gear wheel of the third gear.

2. The shift device as claimed in claim 1, wherein the further gearshift sleeve is rotationally fixed to the output shaft.

3. The shift device as claimed in claim 2, wherein the further gearshift sleeve is arranged between two gear wheels of the second and third gear pair and wherein the gear wheels are embodied as loose gears and are assigned to the output shaft.

4. The shift device as claimed in claim 1, wherein the further gearshift sleeve is assigned to the carrier component and wherein the further gearshift sleeve is rotationally fixed to the carrier component.

5. The shift device as claimed in claim 4, wherein the further gearshift sleeve is brought into rotationally fixed engagement with the loose gears of the second or third gear pair.

6. The shift device as claimed in claim 1, wherein the gear wheel of the first gear pair, which is brought into rotationally fixed engagement with the gearshift sleeve, is assigned to the output shaft.

7. The shift device as claimed in claim 6, wherein the gear wheel of the first gear pair is embodied as a loose gear.

8. The shift device as claimed in claim 1, wherein a further carrier component is assigned to the output shaft, on which at least two loose gears are rotatably supported.

9. The shift device as claimed in claim 8, wherein the gearshift sleeve rotationally fixed to the output shaft is in one shift position brought into rotationally fixed engagement with the further carrier component.

10. The shift device as claimed in claim 8, wherein a gearshift sleeve is assigned to the further carrier component and wherein the gearshift sleeve is rotationally fixed to the further carrier component.

11. The shift device as claimed in claim 10, wherein the gearshift sleeve is brought into rotationally fixed engagement with the loose gears supported on the further carrier component.

12. The shift device as claimed in claim 1, wherein the mechanism actuated by a PTO stub shaft comprises a component moveable in an axial direction, moved by means of a PTO stub shaft, and wherein the component is preferably biased, for example by means of a spring.

13. The shift device as claimed in claim 12, wherein the component is formed in such a way that it serves to move the gearshift sleeve of the output shaft, or wherein the component interacts with a further component, which serves to move the gearshift sleeve of the output shaft.

* * * * *